No. 618,576. Patented Jan. 31, 1899.
H. P. MERRIAM & E. J. WESSELS.
PNEUMATIC BRAKE APPARATUS.
(Application filed May 18, 1897.)
(No Model.) 4 Sheets—Sheet 1.

WITNESSES:
INVENTORS
Edward J. Wessels and
Henry P. Merriam,
BY
ATTORNEY.

No. 618,576. Patented Jan. 31, 1899.
H. P. MERRIAM & E. J. WESSELS.
PNEUMATIC BRAKE APPARATUS.
(Application filed May 18, 1897.)

(No Model.) 4 Sheets—Sheet 2.

No. 618,576. Patented Jan. 31, 1899.
H. P. MERRIAM & E. J. WESSELS.
PNEUMATIC BRAKE APPARATUS.
(Application filed May 18, 1897.)
(No Model.) 4 Sheets—Sheet 3.
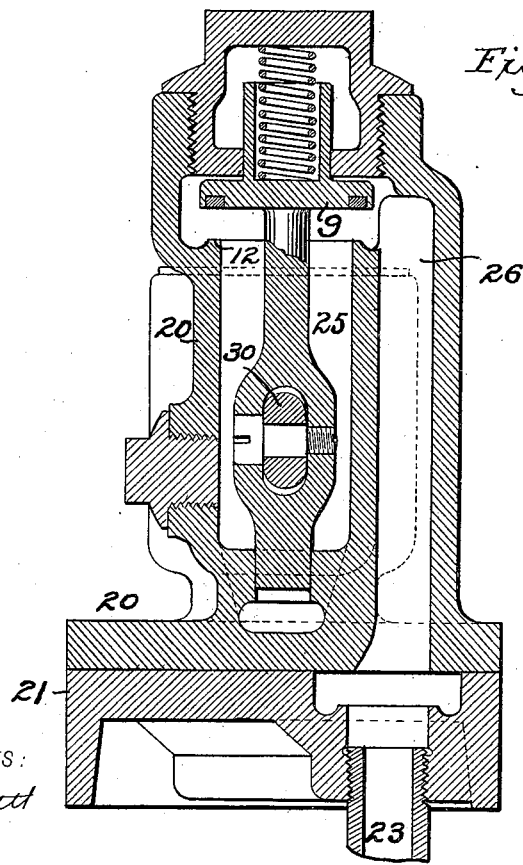

No. 618,576. Patented Jan. 31, 1899.
H. P. MERRIAM & E. J. WESSELS.
PNEUMATIC BRAKE APPARATUS.
(Application filed May 18, 1897.)
(No Model.) 4 Sheets—Sheet 4.
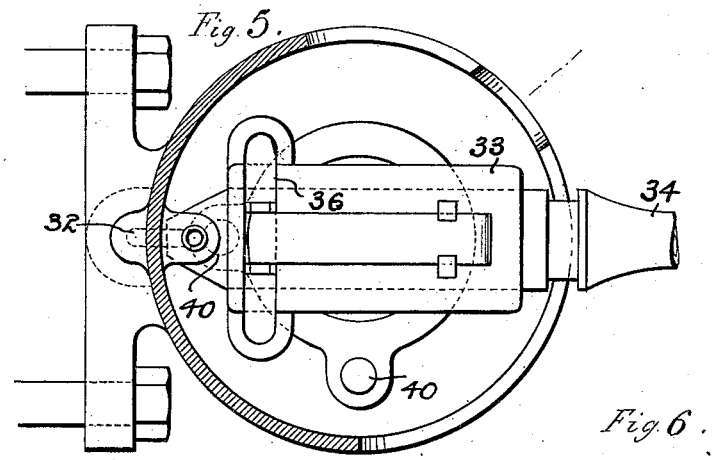
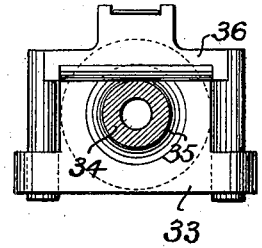
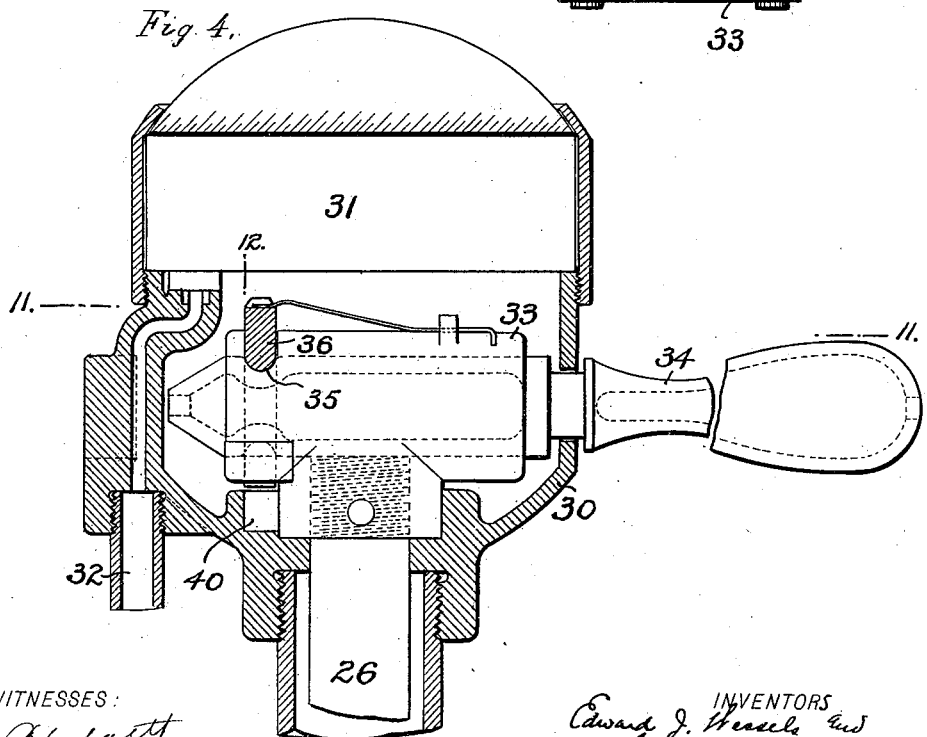

UNITED STATES PATENT OFFICE.

HENRY P. MERRIAM, OF NEW YORK, N. Y., AND EDWARD J. WESSELS, OF EAST ORANGE, NEW JERSEY, ASSIGNORS TO THE STANDARD AIR BRAKE COMPANY, OF NEW YORK.

PNEUMATIC BRAKE APPARATUS.

SPECIFICATION forming part of Letters Patent No. 618,576, dated January 31, 1899.

Application filed May 18, 1897. Serial No. 637,102. (No model.)

*To all whom it may concern:*

Be it known that we, HENRY P. MERRIAM, of the city, county, and State of New York, and EDWARD J. WESSELS, of East Orange, Essex county, New Jersey, citizens of the United States, have invented certain new and useful Improvements in Pneumatic Brake Apparatus, of which the following is a specification.

This invention relates to brake apparatus, and more particularly relates to controlling means therefor, the primary object of the invention being to provide an improved organization and construction of mechanism for controlling the brakes.

A further object of this invention is to provide an improved controlling means so constructed that the same can be readily assembled and when assembled is compact, durable, and effective in operation to accomplish the desired purpose.

Figure 1:
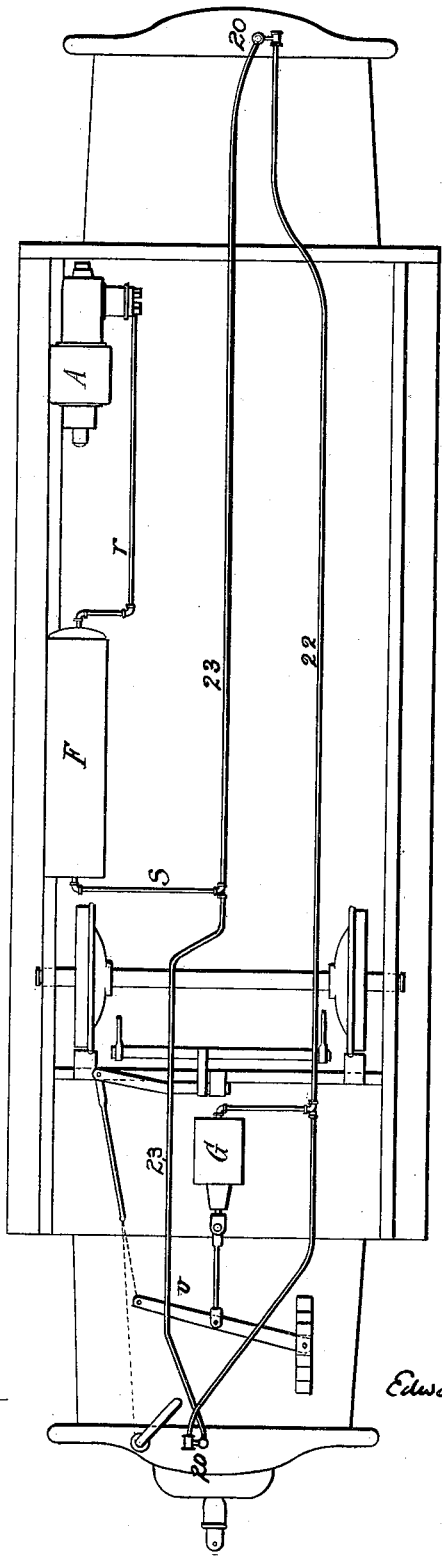
Figure 2:
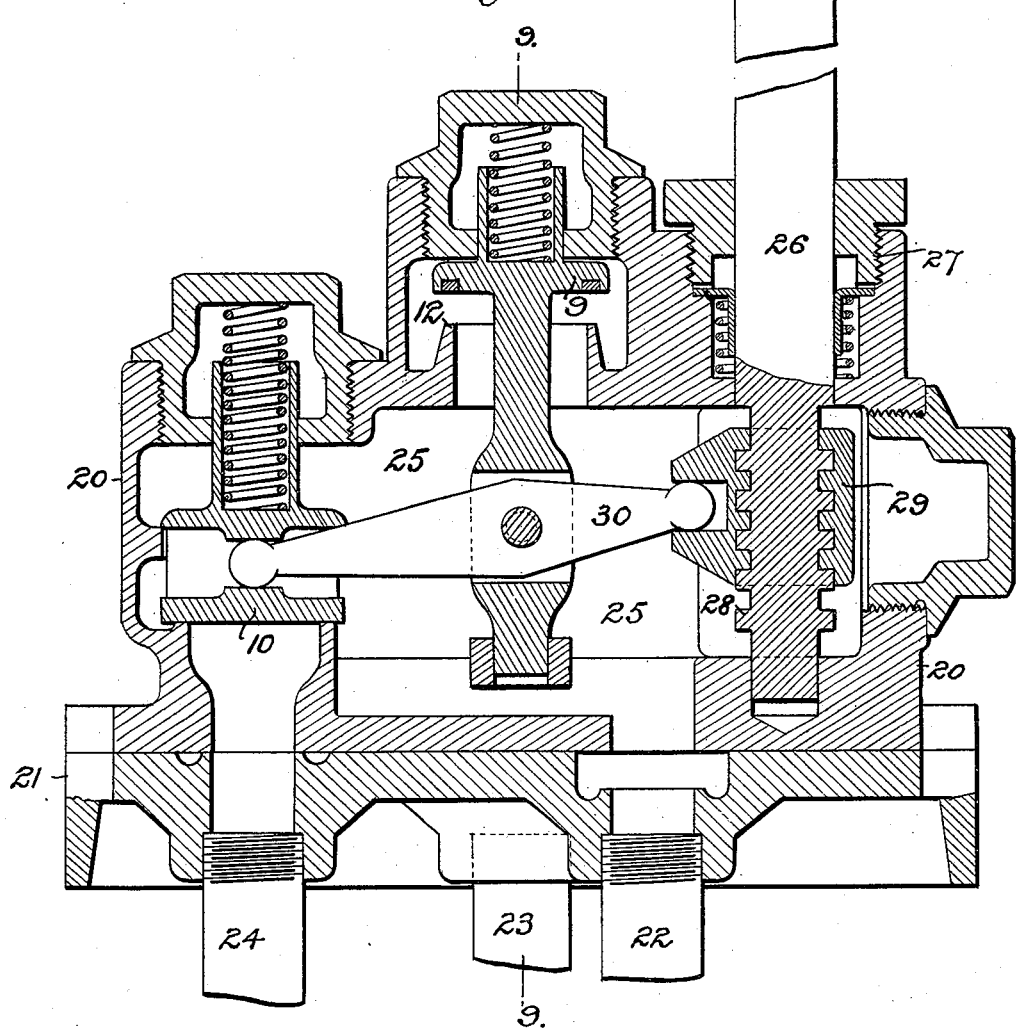

In the drawings forming part of this specification, Figure 1 is a diagrammatic plan view of one form of brake apparatus in connection with which this improved controlling means may be used. Fig. 2 is a vertical sectional view of the controlling-valve mechanism. Fig. 3 is a vertical cross-sectional view of the same, taken in line 9 9 of Fig. 2. Fig. 4 is a vertical sectional view of a valve-controller mechanism ordinarily designated as a quadrant. Fig. 5 is a horizontal sectional view thereof, taken in line 11 11 of Fig. 4; and Fig. 6 is a cross-sectional view taken in line 12 12, Fig. 4, showing the handle and handle-socket lock.

In the drawings is shown one form of an air compressor and motor (designated in a general way by A) in connection with which this improved controlling means may be used, and which compressor and motor may be supported by the floor of the particular vehicle in connection with which it is to be used—for instance, a car—and is preferably disposed at the under side thereof—such, for instance, as beneath one of the seat portions adjacent to one end of the car. The compressed air is conducted from the compressor (designated in a general way by B) by a conduit, such as a pipe *r*, to an air-reservoir F and there stored for use. This reservoir is in turn connected by a branch conduit, such as a pipe *s*, with a conduit 23, leading to the valve-controlling mechanisms. (Shown herein disposed one at each end of the car.) From the valve mechanisms another conduit 22 leads to the brake-cylinder G, connected and operable through any well-known construction of levers and connections *v* to set and release the brakes as the air-pressure is by the valve-controlling means admitted to or exhausted from said brake-cylinder.

To control the admission of compressed air to and the exhaust of such air from the brake-cylinder, thereby to put on and let off the brakes, suitable controlling means is provided, which in the preferred form thereof herein shown and described comprises valve-mechanism and a valve-controlling device or means.

In the preferred construction shown herein the controlling-valve mechanism, Figs. 2 and 3, comprises two separate and independently-movable valves 9 and 10, the former for controlling connection between the compressed-air reservoir F and the brake-cylinder G and the latter for controlling communication between the brake-cylinder and the atmosphere. This controlling-valve mechanism in this construction is shown in duplicate, carried one at each end of the car, each mechanism being supported within a casing 20, removably secured to a base-plate 21, and is in communication with the brake-cylinder G by a conduit 22 and with the air-reservoir F by a conduit 23. Also leading from the casing is an exhaust-air conduit 24, which may lead to any convenient point on the vehicle, and which communicates with the chamber 25 when the valve 10 is open. In the present structure the brake-cylinder conduit 22 opens directly into the chamber 25 of the controlling-valve casing, while the reservoir-conduit 23 communicates with a passage 26', Fig. 3, which communicates with said chamber 25 when the valve 9 is open.

By having the casing 20 detachable from its base-plate such casing and its valves can be readily removed, should the valves need attention, and a similar mechanism substituted therefor, and this without affecting the conduits 22, 23, and 24, as they terminate in the base-plate 21.

Each of the valves 9 and 10 is shown disposed in position to seat, respectively, on seats 12 and 12' by means of suitable springs 13 and 14, each in engagement with a removable closure, preferably threaded into the casing 20, by means of which access can be readily had to the valve-chamber. Each of the closures is shown having a chamber into which projects the stem of its respective valve, being guided therein by an inwardly-extending flange of said closure, said stem being recessed for the reception of its spring. The casing is also provided with a removable plug 15, through which and a suitable gland suitable operating means for the valve extends, and which operating means is shown herein as a rod 26. The lower end of this rod projects into a recess of the casing, and above which it is threaded for the reception of a shiftable member or nut 29, which can be placed in position by means of a removable closure 16. The member 29 is kept from turning by the opposed walls of the casing and has a recess 29' for the reception of one end of a lever 30, the opposite end of which extends into a recess 10' of the exhaust-valve 10. This lever is fulcrumed intermediate its points of connection 10' and 29' to the depending stem 9' of the valve 9, and for this purpose it projects through an opening therein, the lower end of said stem being guided by a recessed part of the casing.

In the position of the parts shown in Figs. 2 and 3 the exhaust-valve 10 is closed, thereby cutting off the brake-cylinder G from the atmosphere, while the valve 9 is open, allowing compressed air to pass from the reservoir F to the brake-cylinder, thereby setting the brakes in the usual manner. When it is desired to release the brakes, the operating-rod 26 is rotated to cause the member 29 to travel downwardly thereon, thus rocking the lever 30. This first brings the valve 9 to its seat and by a further travel of the member 29 and an additional movement of the lever raises the exhaust-valve 10 from its seat. The seating of the valve 9 in advance of the lifting of the valve 10 is effected by the action of its spring and the force of air-pressure tending to hold said valve 10 seated, which causes the lever 30, instead of rocking on its fulcrum in the stem 9' of the valve 9, to move downwardly as a whole relatively to its connection with the valve 10, the spring of which tends to keep it seated and resists all effort to lift said valve until after the valve 9 has been seated, at which time, the valve 9 and its stem 9' coming to rest and the fulcrum therein remaining stationary, any further movement of the lever 30 must be a rocking one on said fulcrum and a consequent lifting of the exhaust-valve 10 from its seat against the pressure of its spring. The lever has thus, in effect, two fulcrums, one adjacent to its center and the other at the end thereof adjacent to the valve 10. In like manner when the brakes are to be set a reverse rotation of the operating-rod 26 causes the member 29 to travel upwardly thereon and by reason of the tendency of the spring acting on the valve 10 results in a consequent rocking of the lever 30 on its fulcrum in the stem 9' of the valve 9, whereby the closing of the exhaust-valve on its seat is effected, after which a further upward travel of the member 29 then shifts the lever bodily relatively to its connection with the valve 10 and so lifts the valve 9 from its seat, thereby admitting air-pressure from the reservoir to the brake-cylinder.

The operating-rod 26 leads upwardly from the valve-casing 20 and has connected therewith the valve-controlling means, which in the preferred form thereof herein shown and described comprises a quadrant-casing 30', supporting on its upper side a suitable air-pressure gage 31, having communication with the air-reservoir by a conduit 32. Supported in this casing is a horizontally-disposed socketed member 33, constituting an operating-lever or handle-holder secured to the upper end of the rod 26, preferably by means of a threaded hub receiving the threaded end of said rod, both said rod and socketed member having suitable bearings in the casing 30'. This socketed member 33 receives and holds the stem of an operating handle or lever 34, and for this purpose the extreme end of the handle is beveled to facilitate the insertion and withdrawal thereof and is provided with a circumferential recess or groove 35, adjacent to such bevel portion, and which groove is in position to receive an automatically-shiftable locker, (shown herein as a spring-pressed yoke or bifurcated member 36, Fig. 6,) which acts as a yielding lock to hold the handle in its socket. This yoke or bifurcated member, together with a suitable spring 36' for maintaining the same in position, is carried by the member 33, the depending members 36" of the yoke passing through openings 37, formed in laterally-extending ears 38 of the socketed member 33, said depending members being properly guided thereby. In alinement with these openings 37 the casing is provided with recesses 40, into which the depending members 36" project when the handle is withdrawn, whereby the member 33 is locked, thereby to prevent the rotation of the operating-rod at this time.

The handle-stem adjacent to the handle 34 is shown of less diameter than the major part of such stem to permit it to work in a corresponding width of slot 41 in the casing-wall and through which slot the stem projects into the socket of the member 33, thereby preventing the handle from being detached at any of its positions in the arc of its movement except at the one point where the slot is enlarged to permit its withdrawal and insertion. On shifting the handle into position to permit its withdrawal the socketed member will be also shifted into position to permit the projections of the yoke to enter the recesses 40 and so lock such member and the rod 26, and thereby the valve mechanism, against movement until the handle is again in operative position.

While the use of this particular construction of controlling mechanism has been described as employed in air-brake apparatus, it is to be understood that it may be used in other situations and for other purposes without thereby affecting the scope of the invention.

Having thus described my invention, I claim—

1. In an apparatus of the class specified, brake-mechanism-controlling means comprising an inlet-valve; an exhaust-valve; a lever having a fulcrum connection with each of said valves; and means having a rotative movement for operating said lever thereby to operate the valves, one preceding the other.

2. In an apparatus of the class specified, the combination of a casing; an inlet-valve; an exhaust-valve; a lever having a fulcrum connection with each of said valves; a reciprocatory member operatively connected with said lever; and means operatively connected to said reciprocatory member and having a rotative movement for reciprocating said member and thereby to operate the lever to actuate said valves, one preceding the other.

3. The combination of a pair of valves one operative to control the inflow to and the other the exhaust of fluid; a lever having a fulcrum connection with each of said valves; and means for operating said lever, and thereby the valves, first to move said lever bodily in one direction thereby to seat one of the valves, and then to rock said lever relatively to said seated valve thereby to open the other valve, and then operative to rock said lever relatively to the seated valve, thereby to shut the opened valve, and then operative to move said lever bodily in the opposite direction thereby to open the first seated valve.

4. The combination of a valve-casing; a pair of spring-pressed valves, one operative to control the inflow and the other the exhaust of compressed air; a lever having a fulcrum connection at one end with the exhaust-valve, and a fulcrum connection intermediate its ends with the inflow-valve, and means for actuating said lever and operative, first, to move said lever downward bodily relative to its fulcrum connection with the exhaust-valve, thereby to close the inflow-valve, and then to rock said lever relatively to its fulcrum connection with the inflow-valve, thereby to open the exhaust-valve; and then operative to rock said lever relatively to its inflow-valve, thereby to close the exhaust-valve, and then move said lever upward bodily thereby to open the inflow-valve.

5. Valve mechanism comprising a pair of valves one operative to control the inflow and the other the exhaust of fluid; a lever having a fulcrum connection with each of said valves; a shiftable, interiorly-threaded member in operative connection with said lever for operating the same and thereby the valves; and an operating-rod having exterior threads in engagement with the interior threads of said shiftable member.

6. Valve mechanism comprising a casing having a pair of valve-seats; an inflow-conduit connected with said casing and opening above one of said valve-seats; an outflow-conduit connected with said casing below said valve-seat; an exhaust-conduit connected with said casing adjacent to the other valve-seat; a pair of spring-pressed valves disposed in said casing, one for controlling the inflow and the other the exhaust of fluid; a lever having a fulcrum connection adjacent to one end with one of said valves and a fulcrum connection intermediate its ends with the other of said valves; and means having a rotative movement for moving said lever bodily at one period and for rocking the same at another period, thereby to operate said valves one preceding the other.

7. A controlling device for valve mechanism comprising a shiftable member having a horizontally-disposed socket and having a rotative movement in a horizontal plane; a removable lever or handle disposed in the socket of said shiftable member and having its entire rotative movement in a horizontal plane and also having its horizontal axis from end to end thereof coinciding with the horizontal axis of said socket, whereby said handle can be withdrawn therefrom in a horizontal plane; and automatically operative means for locking said handle in position relatively to said shiftable member and for locking said shiftable member against movement on the removal of said handle.

8. A controlling device for valve mechanism comprising a support having a recess; a shiftable member carried by said support and having a socket above said recess and a transverse opening above and in communication with said socket; a removable handle projecting into said socket and having a circumferential groove registering with said transverse opening; and a spring-pressed member carried by said shiftable member and having a part thereof adapted to project through said transverse opening and into the handle-groove, thereby to maintain said handle in position, and operative on the removal of the handle to have another part thereof project into the recess of said support below said transverse opening and socket, thereby to lock said shiftable member against movement.

9. In a valve-controlling mechanism, the combination with a rod having a rotary movement, of a socketed member rigidly connected with said rod, and provided, adjacent to one end thereof, with a transverse opening communicating with said socket; a removable handle carried by said socketed member and having a circumferential groove, adjacent to one end thereof, registering with said transverse opening; and a bifurcated member straddling said socketed member and having a part thereof working in said transverse opening to engage said handle-groove, thereby to lock said handle in position.

10. In a valve-controlling mechanism, the combination with a support, of a rod supported thereby for rotary movement; a socketed member rigidly connected with said rod, and provided, adjacent to one end thereof, with a transverse opening communicating with said socket; a removable handle carried by said socketed member and having a circumferential groove, adjacent to one end thereof, registering with said transverse opening; a bifurcated member straddling said socketed member and having a part thereof working in said transverse opening to engage said handle-groove, thereby to lock said handle in position, and also having a part thereof engaging said support, thereby to lock said socketed member and rotary operating-rod against movement on the removal of said handle.

11. In a valve-controlling device, the combination of a casing having a fluid-pressure gage and a conduit leading thereto and also having a pair of recesses; a socketed member shiftably supported by said casing and having an opening and also having an apertured projection at each side thereof; a removable handle having a circumferential groove adapted to register with said opening; and a spring-pressed yoke shiftable with said socketed member and one part thereof extending through said opening and projecting into the groove of said handle to lock said handle in position and the other parts thereof guided by said apertured projections and adapted to project into said casing-recesses on the removal of said handle, thereby to lock said socketed member against shifting movement.

12. In an apparatus of the class specified, brake-mechanism-controlling means comprising an inlet-valve and an exhaust-valve; a lever having a fulcrum connection with each of said valves; operating means having a rotative movement for actuating said lever and thereby the valves; a lever or handle removably connected to said operating means; and means for locking said operating means, and thereby the valve mechanism, against movement on the removal of said handle.

13. In an apparatus of the class specified, brake-mechanism-controlling means comprising valve mechanism comprehending an inlet and an exhaust valve; a lever having a fulcrum connection with each of said valves; operating means having a rotative movement for actuating said lever, and thereby the valves, a lever or handle removably connected with said operating means, and thereby the valve mechanism, against movement on the removal of said handle.

14. In an apparatus of the class specified, brake-mechanism-controlling means, comprising a casing having an inlet-valve and an exhaust-valve therein; a lever having a fulcrum connection with each of said valves; means for operating said lever thereby to operate the valves; and controlling means for said valve mechanism and comprising a socketed member in engagement with said operating means; a removable handle carried thereby; and means for securing said handle in position and adapted to secure said socketed member and thereby the valve mechanism against movement on the removal of said handle.

15. In an apparatus of the class specified, brake-mechanism-controlling means comprising an inlet and an exhaust valve; a lever having a fulcrum connection with each of said valves; an exteriorly-threaded shiftable member connected with said lever; a threaded rod for operating said shiftable member; and valve-controlling means comprising a socketed member secured to said rod for shiftable movement therewith and having an opening; a removable handle provided with a groove adapted to register with said opening; and means for locking said handle in position and for locking said shiftable member and thereby the valve mechanism against movement on the removal of said handle.

16. In an apparatus of the class specified the combination of a pair of valves, one operative to control the inflow and the other the exhaust of fluid; a lever having a fulcrum connection with each of said valves; and a threaded shiftable member in engagement with said lever, a threaded rod for operating said shiftable member and thereby the valves one preceding the other.

17. In an apparatus of the class specified, valve mechanism comprising a valve-casing; a pair of valves disposed therein, one operative to control the inflow to and the other the exhaust from said casing; a lever having a fulcrum connection with each of said valves; a rod operating said lever and thereby the valves, first to move said lever bodily in one direction thereby to seat the inflow-valve and then to rock said lever relatively to the inflow-valve thereby to open the exhaust-valve, and then operative to rock said lever relatively to the inflow-valve thereby to shut the exhaust-valve, and then operative to move said lever bodily in the opposite direction thereby to open the inflow-valve; a socketed member secured to said rod; a handle removably carried by said socketed member; and means carried by said socketed member for locking said handle in position and for locking said socketed member and rod and thereby the valve mechanism against movement on the removal of said handle.

18. In a brake apparatus, the combination of a motor; a compressor in operative connection therewith; a reservoir in operative connection with said compressor; a brake-cylinder; valve mechanism operatively connected with said reservoir and brake-cylinder and comprising a pair of valves, one operative to control the inflow and the other the exhaust of compressed fluid; a lever having a fulcrum connection with each of said valves; and means for operating said lever and thereby the valves, first to move said lever bodily in one direction thereby to seat the inflow-valve, and then to rock said lever relatively to said inflow-valve thereby to open the exhaust-valve, and then operative to rock said lever relatively to the inflow-valve thereby to shut said exhaust-valve, and then operative to move said lever bodily in the opposite direction, thereby to open the inflow-valve.

19. In a brake apparatus, the combination of a motor; a compressor in operative connection therewith; a reservoir in operative connection with said compressor; a brake-cylinder; valve mechanism operatively connected with said reservoir and brake mechanism and comprising a pair of valves, one operative to control the inflow and the other the outflow of compressed fluid; a lever having a fulcrum connection with each of said valves, and a rod operatively connected with said lever; and controlling means for said valve mechanism, and comprising a removable handle, and means for locking said valve mechanism against movement on the removal of said handle.

20. In a brake apparatus, the combination of a motor; a compressor operatively connected therewith; a reservoir operatively connected with said compressor; a brake-cylinder; valve mechanism comprising a pair of valves, one for controlling the admission of fluid from said reservoir to the brake-cylinder, and the other the exhaust of fluid from said brake-cylinder; a lever having a fulcrum connection with each of said valves; an operating member connected with said lever and having a rotative movement; and controlling means for said valve mechanism and comprising a handle removably secured to said operating member; and means operative to lock said handle in position and also to lock said operating member, and thereby the valve mechanism, against movement on the removal of said handle.

21. In an apparatus of the class specified, controlling means comprising an inlet-valve and an exhaust-valve; a lever having a fulcrum connection with each of said valves; operating means having a rotative movement for actuating said lever and thereby the valves; a handle removably connected to said operating means; and automatic means for maintaining said handle in position.

22. In a brake apparatus, the combination of a motor; a compressor in operative connection therewith; a reservoir in operative connection with said compressor; a brake-cylinder; valve mechanism operatively connected with said reservoir and brake mechanism and comprising a valve-casing; a pair of valves disposed therein, one operative to control the inflow and the other the exhaust of compressed fluid; a lever having a fulcrum connection with each of said valves; and means for operating said lever and thereby the valves; first to move the lever bodily in one direction thereby to seat the inflow-valve, and then to rock said lever relatively to said inflow-valve, thereby to open the exhaust-valve, and then operative to rock said lever relatively to the inflow-valve, thereby to shut the exhaust-valve, and then operative to move said lever bodily in the opposite direction, thereby to open the inflow-valve; and controlling means for said valve mechanism and comprising a support having a recess; a socketed member carried by said support for shiftable movement and having an opening; a handle having a circumferential groove adapted to register with said opening; and a locking member carried by said socketed member and having one part thereof adapted to project into said opening and into the groove of said handle when in position, and adapted to have another part thereof project into the recess of said support on the removal of the handle, thereby to lock said shiftable member against movement.

In witness whereof we have hereunto set our hands in the presence of two witnesses.

HENRY P. MERRIAM.
EDWARD J. WESSELS.

Witnesses:
M. F. AMSTETT,
FRED KLUSMANN.